United States Patent [19]

Richard et al.

[11] 4,071,715

[45] Jan. 31, 1978

[54] PUSH-BUTTON SWITCH FOR A MULTIFREQUENCY DIALLING TELEPHONE SET

[75] Inventors: Pierre D. Richard; Claude R. Tessier, both of Chateaudun, France

[73] Assignee: Societe des Telephones Picart Lebas, Paris, France

[21] Appl. No.: 737,557

[22] Filed: Nov. 1, 1976

[30] Foreign Application Priority Data

Dec. 17, 1975 France .................................. 75 38739

[51] Int. Cl.² ............................................ H04M 1/50
[52] U.S. Cl. .................................................. 179/90 K
[58] Field of Search .................. 179/90 K; 178/17 C; 197/98 R; 200/8 A, 5 R, 6 R, 6 BB, 6 C, 159 R, 159 A; 340/365 R, 365 S

[56] References Cited

U.S. PATENT DOCUMENTS

| | | | |
|---|---|---|---|
| 3,080,457 | 3/1963 | Jansson et al. | 179/90 K |
| 3,355,558 | 11/1967 | Geese et al. | 179/90 K |
| 3,731,030 | 5/1973 | Holzer | 200/5 A |
| 3,731,032 | 5/1973 | Schantz | 200/6 BB |
| 3,870,840 | 3/1975 | Rivetta et al. | 179/90 K |
| 3,896,283 | 7/1975 | Hayden | 200/159 R |

*Primary Examiner*—Kathleen H. Claffy
*Assistant Examiner*—Gerald L. Brigance

[57] ABSTRACT

A push-button switch for a multifrequency dialling telephone set is described. By utilizing a connection group of three conducting reeds between the support plane and the telephone casing, at least two of which are rigid and rotatably mounted at one of their ends, the transmission duration of multifrequency signals associated with each push-button on the telephone line is accomplished with great accuracy. The pressure exerted on a selected push-button during a first phase of its stroke corresponding to the multifrequency signal selection issued from the multifrequency generator disconnected from the telephone line is lower than that during a second phase of its stroke corresponding to the multifrequency signal transmission from multifrequency generator to the telephone line. During the first phase, the downward pressure exerted on the pushbutton is directed against the differential force of the upward flexion stress of a first spring and the upward torsion stress of a second spring. During the second phase, the downward pressure exerted on the push-button is only directed against the stress of the first spring. At this end, each push-button is associated with a rigid conducting reed pivotably mounted at one end and only subjected to torsion stress of the second spring during the second phase. The two rotatably mounted reeds of the connection group are released by long and loose springs.

8 Claims, 5 Drawing Figures

PUSH-BUTTON SWITCH FOR A MULTIFREQUENCY DIALLING TELEPHONE SET

CROSS REFERENCE TO RELATED APPLICATIONS

Applicants hereby make cross reference to their French Patent Application PV No. 75 38739, filed Dec. 17, 1975 and claim priority thereunder following the provisions of 35 U.S.C. 119.

BACKGROUND OF THE INVENTION

1. Field of the Invention

The invention relates to a push-button switch device for a multifrequency dialling telephone set.

A push-button switch for multifrequency dialling basically comprises a set of push-buttons, usually twelve, a multifrequency generator, means for selecting groups of frequencies, (usually pairs of frequencies) transmitted by the multifrequency generator for each push-button and means for connecting the multifrequency generator to the telephone line.

2. Description of the Prior Art.

Push-button switches having frequency selector switch for selecting pairs of frequencies respectively associated with push-buttons and a common switch for the telephone line are known in the art. For example, the article by R. ARAKI, K. TAJIMA and H. NAKAZAWA in the Japanese periodical "Review of the Electrical Communication Laboratory", volume 17, No. 12, December 1969, Pages 1437 – 1455, discloses a push-button switch, in which the common switch is connected to the telephone line after one of the frequency selector switches is connected to the multifrequency generator by a pushing force exerted on the associated push-button.

However, the selector switches and the common switch comprise flexible reeds similar to relay reeds. One end of a flexible reed is fixed at the frame of the push-button switch whereas the other end is restored to the inoperative position in which the selected push-button is not pushed, by one or more springs flanged to their bases. Owing to the additional flexural strenghtes exerted by the reeds in the opposite direction to the pushing force exerted on the selected push-button, a relatively high pressure (at least 200 g.) is required, to the user's discomfort. In addition, the displacement amount of the movable ends of flexible reeds limits the stroke of the contacts of the common switch and the transmission duration of the frequency groups to the telephone line. Consequently, this duration is difficult to adjust accurately and the displacement amount of the released ends of the flexible reeds is less than the stroke of the push-buttons.

Other push-button switches have a switch device for connecting and disconnecting an electronic circuit, e.g. comprising a multifrequency generator, and comprise contact bridges rotating on a pivot and, restored by mechanical means associated with respective push-buttons. A contact bridge and a push-button are restored by additional spring forces in opposition to the pressure exerted on the push-button. For example, the number of additional forces is equal to three as described in U.S. Pat. No. 3,731,030. However, additional forces are exerted against an intermediate element indistinguishable from push-button, so that the push-button dimensions cannot be modified to suit the user, and furthermore the contact bridge closes the electronic circuit only when the push-button is completely pushed, i.e. at the end of the push-button stroke. Thus, the transmission or connection duration depends in inconvenient manner on the time during which the push-button is kept pushed down by the user.

SUMMARY OF THE INVENTION

Therefore, it is an object of the present invention to provide means for connecting the multifrequency generator to the telephone line such that the pressure exerted on each push-button can be low and the displacement amounts of the contacts of means for connecting the multifrequency generator with the telephone line are very long and consequently greater than the stroke of a push-button so as to adjust with great accuracy the transmission duration of frequency groups.

Another object of the present invention is to provide connecting means which close a frequency group selection circuit of the multifrequency generator circuit for a transmission duration which is independent of the time during which the push-button is pushed.

Another object of the present invention is to provide push-buttons, dimensions of which are independent of the stroke of push-buttons and of the operation characteristics of the push-button switch device.

In accordance with the aforementioned objects, the stroke of a push-button comprises two consecutive phases, a first phase during which the pressure exerted on the push-button is directed against the differential force of the upward flexion stress of a first spring and the downward torsion stress of a second spring so that the multifrequency generator is disconnected from the telephone line, and a second phase during which the pressure exerted on the push-button is only directed against the upward flexion stress of the first spring, so that after the beginning of second phase the multifrequency generator is connected to the telephone line for transmitting the frequency group associated with the push-button to the telephone line.

The connecting means of a frequency group selection circuit comprise a first rigid conducting reed only subjected to the downward torsion stress of the second spring, independently of the pressure exerted on the push-button during the second phase. The connecting means the multifrequency generator with the telephone line comprise at least three conducting reeds, at least two which are rotatably mounted at one of their ends and release under the action of the two long draw coil springs so that not much pressure has to be exerted on the push-button.

These and other objects will become apparent from reading the following detailed description of an example embodiment with reference to the accompanying drawings.

BRIEF DESCRIPTION OF THE DRAWINGS

FIG. 5 is a perspective view of the same components as shown in FIG. 4, when the selected push-button is in the down position and is pushed in.

DESCRIPTION OF THE PREFERRED EMBODIMENT

Figure 1:
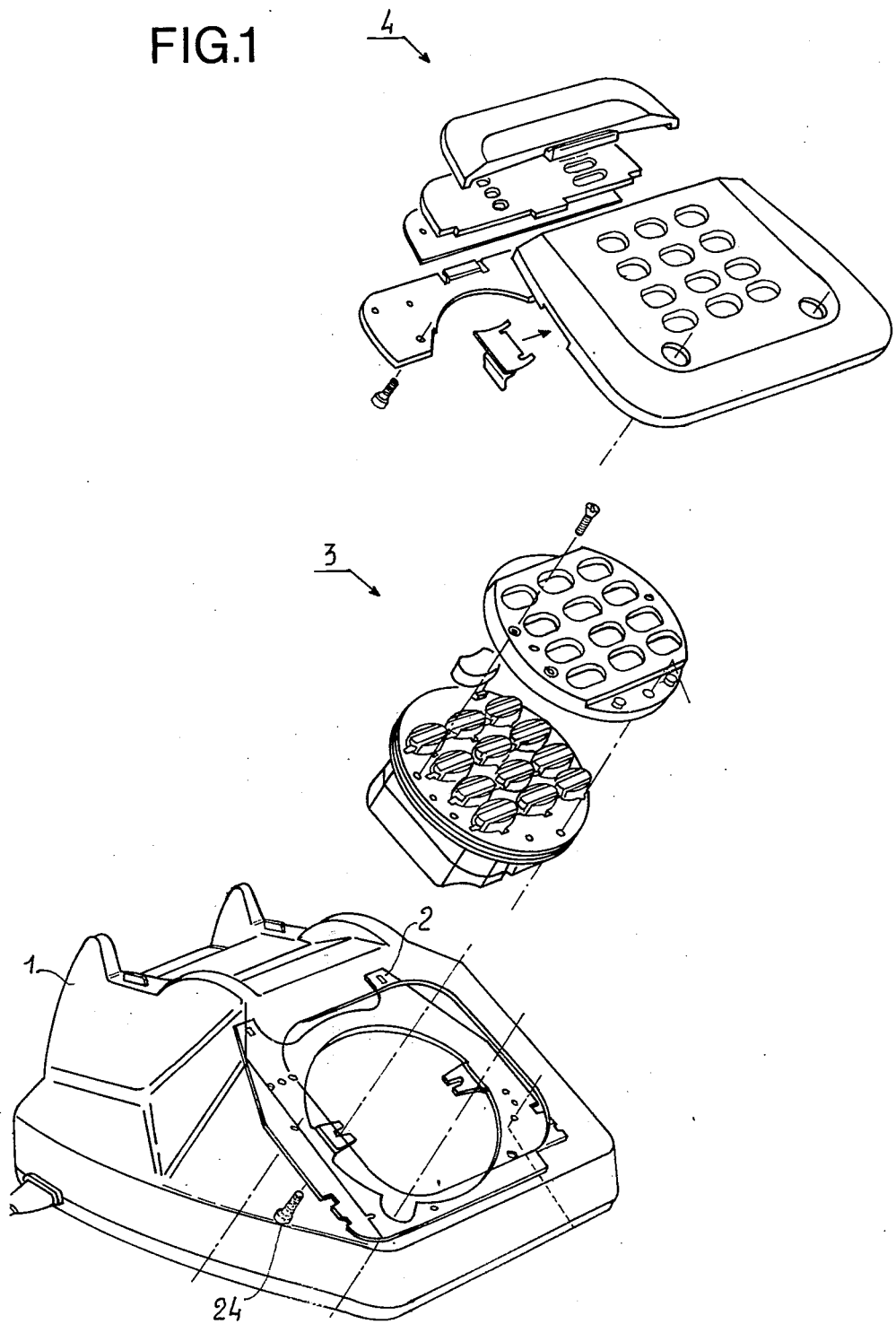
FIG. 1 is an exploded perspective view of a disassembled casing showing a push-button switch device according to the invention disposed between the conventional support plate and casing on a multifrequency dialling telephone set and covered by a hood.

FIG. 1 shows a conventional S 63 telephone set 1 comprising a dial support plate 2 on which a casing 3 is secured. (The S 63 telephone set is described by P. FRANCKEL, A. JOUTY and J. DUPREZ in the French review "Commutation & Electronique", No. 6, April 1964, pages 142 to 154). The casing 3 is covered by a hood 4. The casing contains the push-button switch device according to the invention and electronic circuits comprising inter alia a voice-frequency generator for multifrequency code dialling. The components forming hood 4 and for securing the various aforementioned components to telephone set 1 are similar to those described in French Application No. PV 74 31309 of September 17, 1974 and assigned to the present assignee.

Figure 2:
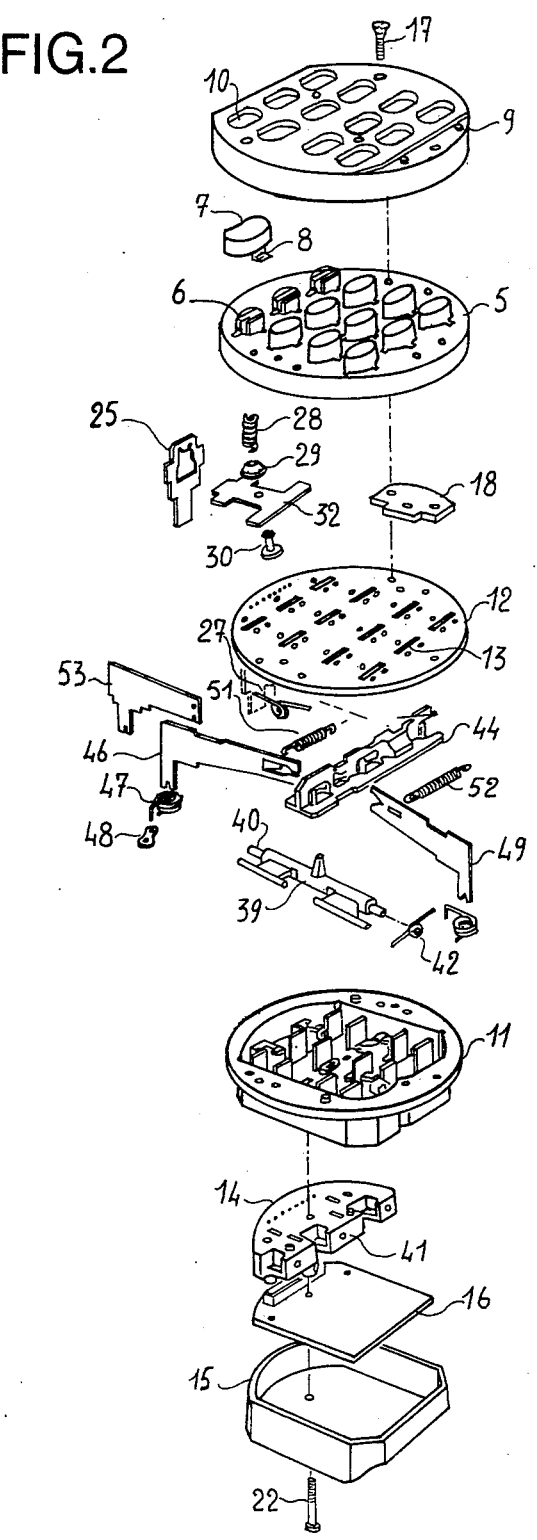
FIG. 2 is an exploded and more detailed perspective view of the main components contained of the casing in FIG. 1.
Figure 4:
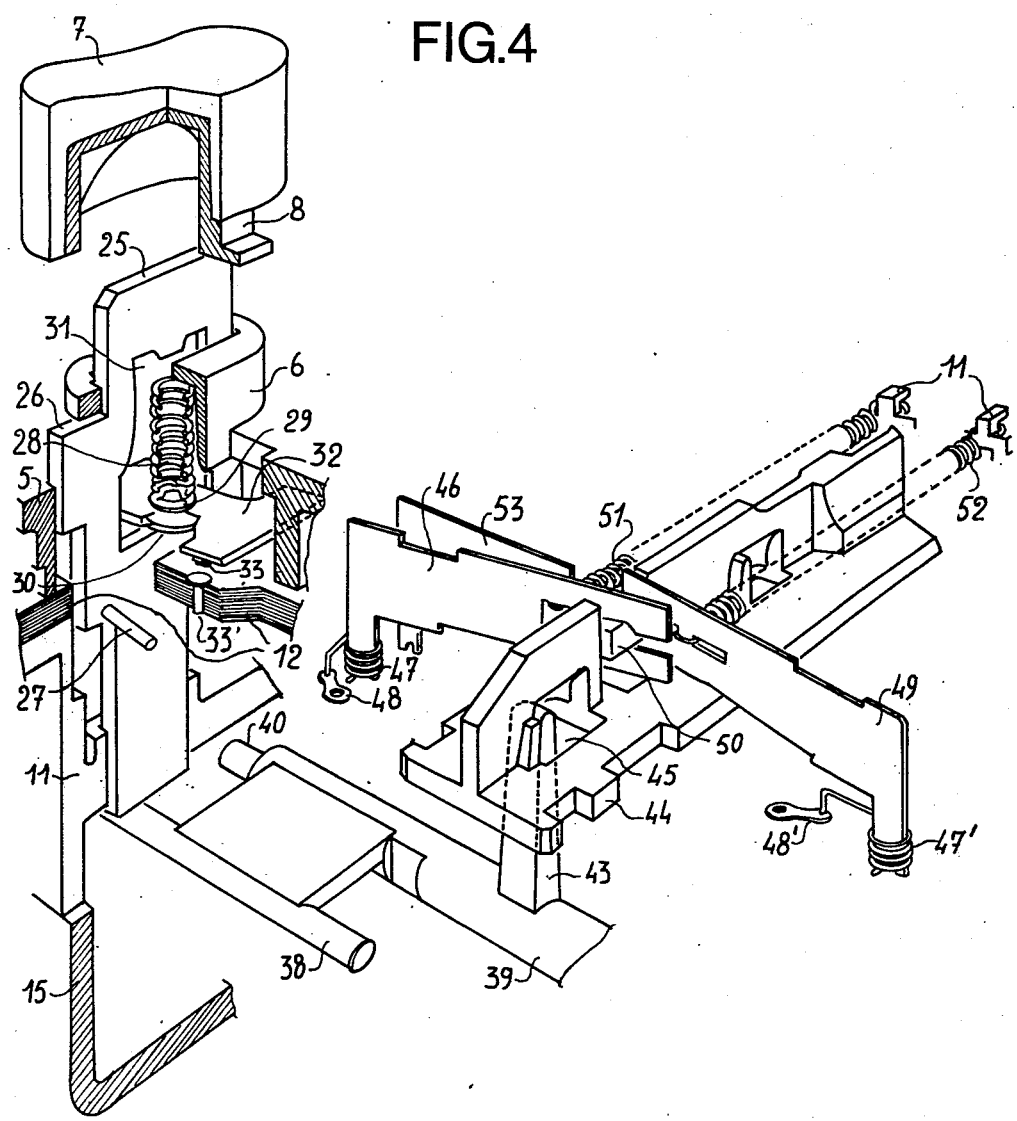
FIG. 4 is the perspective view of a push-button switch device according to the invention with a selected push-button in the up or inoperative position.

The structure of the dismantled casing 3 is shown in FIG. 2. It mainly comprises a hollow generally cylindrical button holder 5 with guiding in opposing side walls having the upper wall portions formed as pairs of parallel projections 6 which face each other and are adapted to house the buttons 7 forming the dial of the telephone set. The bottom portion of each button 6 is formed with two small lateral lugs 8 the top of each of which slides on the outer wide of the top portion of each projection 6, as shown in FIG. 4. A cover 9 is formed with apertures 10 having the same shape as buttons 7 and adapted to engage on the button holder 5; and a dish-like member 11 is secured to the button holder 5 with interposition of a grid 12. The cylindrical hollow top part of member 11 has an outer diameter equal to that of grid 12 and is adapted to engage under the button holder 5 in the cover 9. The bottom part of member 11 is substantially rectangular and its first half is adapted to receive a half-block 14. The half-block 14 is diametrically opposite, and similar in shape to, a second half-block in the member 11. A suitably-shaped protecting frame 15 receives the bottom part of member 11, under which a printed circuit board 16 bearing the electronic parts of the switch device is suitably disposed. Grid 12 is formed with slots 13 centrally positioned under the buttons 7 respectively.

Figure 3:
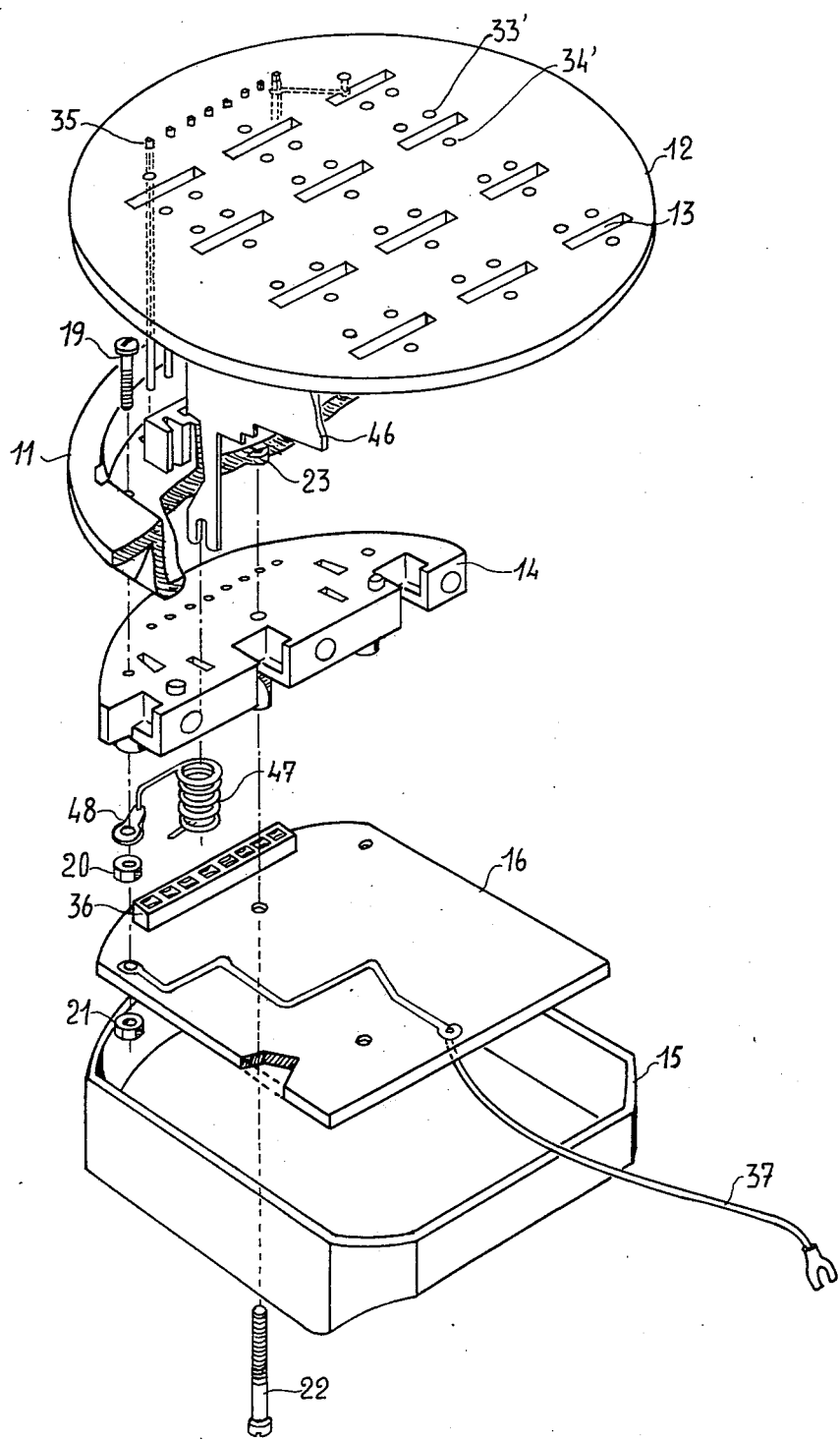
FIG. 3 is an exploded perspective view of the components in the bottom part of the casing of FIG. 1, to show the connections between the various electronic circuits.

Cover 9 is clamped against button holder 5 by means of three screws 17 screwed into two nut plates 18 disposed in the hollow part of button holder 5. This hollow part covered by the grid 12 is adapted to receive mechanical means for selecting pairs of frequencies respectively associated with buttons 7. As shown in FIG. 3, components 11, 14, 16 are secured together by three screws 19 each screwed into two nuts 20, 21 and are secured to the frame 15 by a screw 22 screwed into a nut 23 disposed in the dish-like member 11.

The assembly comprising the holder 5 and cover 9 over the grid 12 is secured to the assembly comprising member 11 and frame 15 so that the two clamped assemblies, which form the casing 3 in FIG. 1, are secured on the dial support plate 2 as shown at the bottom of FIG. 1 by two screws 24 screwed into the two nut plates 18.

The components forming the mechanical push-button switch device according to the invention will now be described in the inoperative position, shown in FIG. 4, i.e. when no button is pressed.

Each button 7 of the dial rests on the top edge of a flat metal guide 25 extending through a slot 13 in the grid 12. The lugs 8 are positioned below the top plane of cover 9. The horizontal sides 26 of lateral notches in the guide 25 are pushed against the edges of two parallel projections 6 in the hollow button holder 5 under the stress exerted upwardly by the upper end of a flexion spring 27 suitably secured in dish-like member 11. The guide 25 is pushed downwards under the torsion stress exerted by a compression spring 28. The top end of this spring 28 bears against the inner edges of the two projections 6 and the bottom end of this spring 28 bears, via a substantially conical washer 29 suitably secured to a stud 30 made of insulating or other material, on the bottom edge of a substantially rectangular aperture 31 in the top part of the guide 25. One median side of a rigid conducting reed 32 having an I shape is held between the washer 29 and the stud 30. The rigid reed 32 has two movable contact studs 33 at one end which cooperate with two fixed contact studs 33' on the grid 12, the pair of contacts 33' selecting a usual pair of frequencies associated with the button 7. The other end of the rigid strip 32 is pivotably articulated between two flanges on the button holder 5 (not shown) and has a movable contact stud 34 between this end and the median sides cooperating with a fixed contact stud 34' on the grid 12 (see FIG. 3). The three contacts 33 and 34 are thus above the plane defined by the three contacts 33' and 34' of the grid 12, when the button 7 is not pressed.

As shown in FIG. 3, the contact studs 33' and 34' when the button 7 is not pressed, open the beginning selection printed circuit of the multifrequency generator relating to the respective frequency group. These contact studs 33' and 34' are positioned on each side of a slot 13 and connected to a printed circuit provided on one surface of the grid 12. The printed circuit is connected by a connector 35 to a connecting strip 36 secured on the board 16 and the connecting strip 36 is connected by the printed circuit of the board 16 to respective frequency selection inputs of the multifrequency generator when a selected button is pressed; the reed 32 which pivots around its articulated end, connects contact studs 33' and 34' so as to select the two voice frequencies corresponding to the button, selected by the multifrequency generator secured on the board 16. The printed circuit of the board 16 is also connected to the three wires of the telephone line to the subscriber's set, only one wire 37 being shown in FIG. 3.

The multifrequency generator is an integrated circuit, well known in the art. This generator, the wiring and the electronic circuits secured to the grid 13 and board 16 do not form part of the invention (as regards their structure) and have not been shown.

The bottom parts of the guides 25 of a row of four buttons slide in a slot having a rectangular cross-section and formed in the dish-like member 11, and are in contact with one of the two cylindrical ends of one of the two arms 38 of a rod 39 of insulating material coaxial to a metal shaft 40 held between two apertures 41 suitably positioned in the half-block 14 and the dish-like member 11 (see FIG. 2). Each arm of rod 38 is held in constant contact with the bottom ends of two guides 25 by means of a flexion spring 42 bent on the shaft 40, one end of the flexion spring 42 being fixed whereas the other substantially pushes the two arms of the rod towards the bottom ends of the four guides 25.

Each rod 39, acting via a lever 43 secured to the rod body, moves straightly a bolt 44 for a distance proportional to the stroke of one of the guides 25 in contact with one of the two arms of the rod. The shaft 40 of each rod is perpendicular to the longitudinal axis of the bolt 44, which slides along a suitable slideway formed on the top part of the dish-like member 11, and the end of the lever 43 of each rod 39 is in mechanical contact with one side of an aperture 45 suitably formed in the bolt 44. According to the invention, the radial dimension of a lever 43 is greater than that of an arm 38 of a rod 39.

A rigid conducting right-angled reed 46 is mounted for rotation around one of its sides, which is connected to a first telephone line wire via a small winding 47 disposed in a suitable insulating cavity in the dish-like member 11 and via a socket 48 secured on the board 16 by the nuts 20, 21 as shown in FIG. 3. Another rigid conducting right-angled reed 49 is mounted for rotation in similar manner to the reed 46 on the other side of the bolt 44. The rigid right angled reed 49 is connected to a first supply terminal of the multifrequency generator via a small winding 47' disposed in a suitable insulating cavity of the disc-like member 11 and via a socket 48' secured on the board 16 by nuts analogous to these 20, 21 shown in FIG. 3, the second terminal of multifrequency generator being connected to a second telephone line wire via the printed circuit of the board 16. The other sides of this two right-angled reeds have suitable recesses for sliding on a guide pin 50 of the bolt 44 when the latter moves. The aforementioned two right-angled reeds 46 and 49 are subjected to tension exerted by long draw coil springs 51 and 52 respectively, one end of each spring being secured to one right-angled reed and one end being secured to the dish-like member 11 by a suitably-shaped hook. In the inoperative position, one end of a third flexible conducting right-angled reed 53 is in electric contact with the end of the reed 46 sliding on the guide pin 50, so that the last-mentioned end bends the end of the reed 53. The other end of the flexible reed 53 is secured to the dish-like member 11 and directly connected to the second telephone line wire so that, in the inoperative position, when no button is pressed as far as the second phase of its stroke, the end of the reed 46 sliding on the guide pin 50 is not in electric contact with the corresponding end of the reed 49, as shown in FIG. 4.

The end of the reed 49 adjacent bolt 44 is still pressed against the base of the pin 50 by the draw stress exerted by the coil spring 52. When no button is pressed as far as the beginning of the second phase of its stroke, reeds 46 and 53 are in electric contact and thus close the telephone line by permanent connection of the first and second wores. Each guide 25 abuts the edges of the two projections 6 under the differential force exerted by the springs 27 and 28, the flexion stress of the spring 27 upwards being greater than the torsion stress exerted in the opposite direction by the spring 28.

The displacement stroke of a selected button 7 or its associated guide 25 is divided into two consecutive phases, when the button is pushed downwards. In the first phase, the depressing force exerted on the selected button is low and equal to the upward differential force between the opposing stress forces of springs 27 and 28. The end of first phase is hereinafter defined at the connection instant of the pair of contacts 33 and the simple contact 34 of the rigid reed 32 with the pair of contact 33' and the simple contact 34' of the grid 12. In the second phase, the depressing force exerted on the selected button is high and equal to the upward stress exerted by the spring 27. The displacement directions of the various components are indicated by arrows in FIG. 5.

Figure 5:
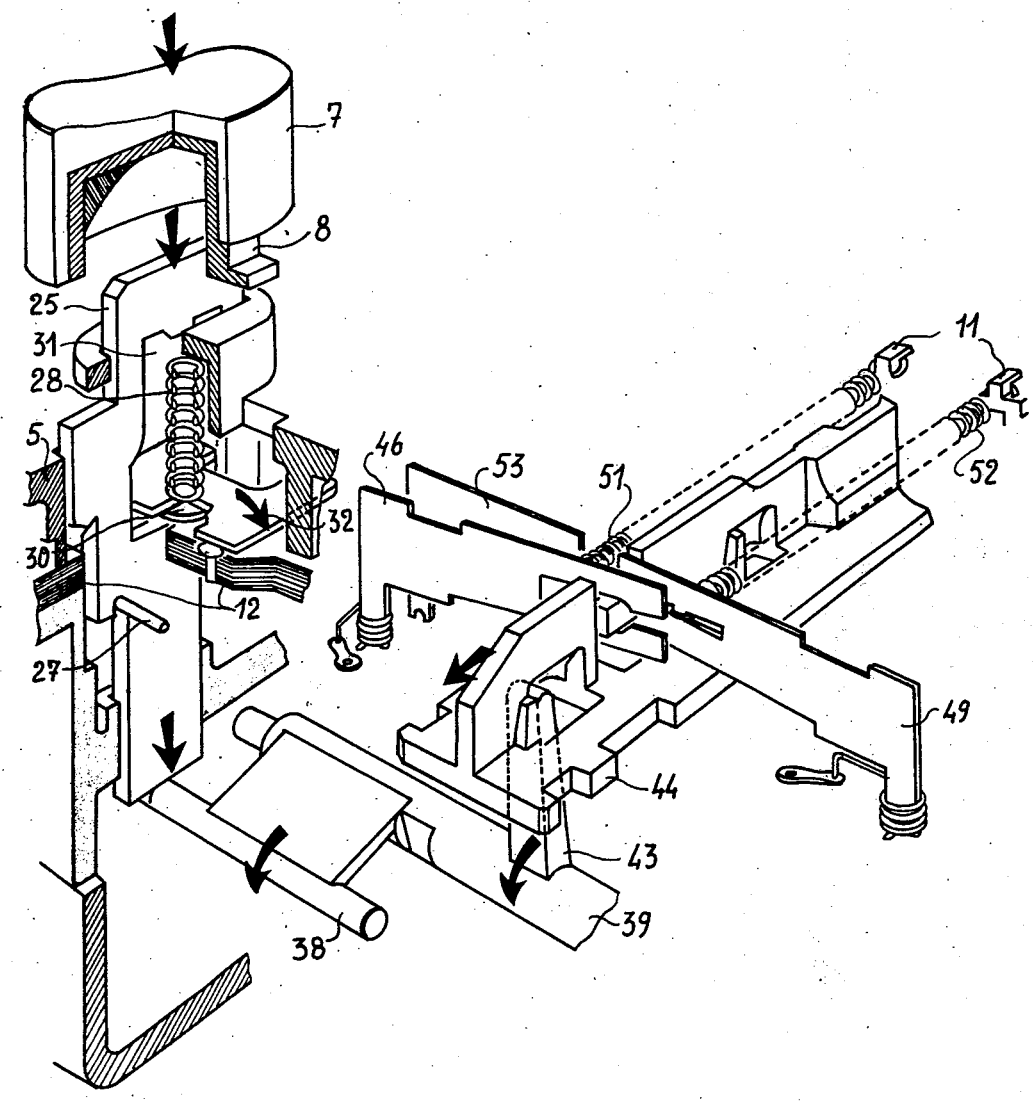

With reference to FIG. 5, the spring 28 expands during the first phase, pushing the three contact studs 33, 34 of the rigid reed 32 respectively against the three contact studs 33',34' so as to select the two multifrequency generator voice frequencies corresponding to the selected button. The movable ends of the right-angle reeds 46, 49 and 53 adjacent bolt 44 are moved in such manner that the electrical contacts between them in the inoperative position remain unchanged, the first terminal of the multifrequency generator being still disconnecting from the first wire of the telephone line. At the end of the first phase, the head of the stud 30 no longer bears against the bottom edge of the aperture 31, with the result that rigid reed 32 is in contact with and identical with the plane defined by the three contact studs 33' and 34' of the grill 12. Consequently, the rigid reed 32 is subjected only to the constant torsion stress of the spring 28, independently of the depressing force exerted on the button 7 during the second phase.

At the beginning of the second phase, after a predetermined displacement of the bolt 44, proportional to the displacement of guide 25 (according to the invention), the amounts of this displacement are in substantially the same ratio — greater than unity — as the radial dimensions of a lever 43 and an arm 38 of a rod 39), the right-angled reed 49 comes into mechanical contact with the right-angled reed 46 and into electric contact with the right-angled reeds 46 and 53, thus connecting the multifrequency generator to the telephone line without opening it, i.e. connecting the first telephone line wire to the first terminal of the multi-frequency generator. This instant corresponds to the transmission beginning of selected multifrequency signal during the first phase. Next, the guide 25 reaches at the stroke end a position at which the lateral portions of the selected button 7 bear against the top surface of the button holder 5; the right-angled reed 53 is no longer bent and is no longer in mechanical and electric contact with the right-angled reed 46, which is pressed against the right-angled reed 49 by the spring 51.

The user releases the selected button. The guide 25 returns to its initial position under the flexion stress force exerted by the flexion torsion spring 27, and at the end of its restoring stroke pulls the stud 30, which raises the mobile end of the rigid reed 32 above the three contact studs 33' and 34'. Under the release forces of coil springs 51 and 52, the rigid right-angled reeds 46 and 49 again make contact with the flexible right-angled reed 53 at an instant defining the end of the maximum transmission duration of the selected multifrequency signals. Next the first terminal of multifrequency generator is disconnected from the first wire of the telephone line when the right-angled reed 49 is disconnected from the right-angled reed 46 under the release forces of the coil springs 51 and 52 with the result that the bolt 44 and the right-angled reeds are returned to their inoperative position. This disconnection occurs before the rigid reed 32 opens again the selection circuit by the disconnection between the pair of contacts 33' and the simple contact 34'.

According to the invention, the release springs 51, 52 have a large number of spirals, (i.e. long and loose) so that when the bolt 44 moves, the draw force exerted on the end of a lever 43 is very low compared with the pressure applied against a button 7 during the pushing stroke and, consequently, is very low compared with the flexion force exerted by the torsion spring 27 during the pushing and restoring strokes. The flexion spring 42 exerts also a very low upward stress compared with that of the spring 27 against the reed 32.

Thus, the aforementioned release springs and the right-angled reeds mounted for rotation allow a considerable displacement of the bolt 44 and, consequently, the transmission duration of the selected multifrequency signals is longer than that of corresponding prior-art push-button switch devices.

By way of example, the pushing stroke or the restoring stroke of guides 25 or buttons 7 is equal to 2.5 mm in the case of a push-button switch device according to the invention mounted on an S 63 telephone set. In the horizontal position, corresponding to the selection of voice frequencies, a rigid reed 32 is applied against the contact studs 33', 34' at a displacement amount of 0.5 mm from the beginning of the stroke or the inoperative position of a guide 25; in the inoperative position, contact studs 33 of the reed 32 are 1 mm above contact studs 33'. Electric contact between the rigid right-angled reeds 46 and 49, corresponding to connection of the first terminal of the multifrequency generator to the first wire of the telephone line, is made at 1 mm from the beginning of the guide or button stroke. Consequently, the displacement amount of a guide 25 during the end of the pushing stroke and the beginning of the restoring stroke is 3 mm during the maximum transmission of multifrequency signals.

In a preferred embodiment of the invention, the three rods 39, which form a single component together with their two arms 38 and lever 43, and bolt 44 are made of plastic material.

In another preferred embodiment, other pairs of right-angled reeds are mounted in similar manner to the right-angled reeds 46 and 53 and positioned along the bolt 44 so as to connect other electronic circuits, the use of which does not form part of the invention.

What is claimed is:

1. A push-button switch device for a multifrequency dialling telephone set which is provided with a multifrequency generator having a first terminal connected to a first wire of a telephone line, and with a printed board for the electronic switch parts as a base which is supported on the dial support plate of the telephone set on which the casing of the telephone set is secured, said printed circuit board providing, for each push-button, a pair of contacts and a simple contact of a circuit for selecting a frequency group of said multifrequency generator, said push-button switch comprising:

first means for connecting said simple contact with said pair of contacts of each said selecting circuit, said connecting means comprising a first rigid conducting horizontal reed pivotably mounted at one end which is tilted on said casing and having a pair of contacts at the other end and a simple contact between said ends, said simple contact and said pair of contacts of said first reed not being in contact with said selection circuit when vertical pressure is exerted on said push-button;

second means for connecting a second terminal of said multifrequency generator to a second wire of said telephone line, said connecting means comprising second and third rigid conducting right-angle reeds on said circuit board rotably mounted at one of their ends which are respectively connected by windings to said second wire of said telephone line and to said second terminal of said multifrequency generator, the other ends of said second and third reeds being movable and not being in contact when vertical pressure is exerted on said push-button, and a fourth flexible conducting right-angle reed fixed at one of its ends on said circuit board which is connected to said first wire of said telephone line, the other end of said fourth flexible reed being free and being in contact with said movable end of said second rigid reed when pressure is exerted on said push-button; and mechanical means comprising first and second springs, the upward stress of said first spring being greater than the downward stress of said second spring and directed against the said downward stress of said second spring and said vertical pressure exerted downwardly on said push-button, and long draw coil springs for releasing said movable ends of said second and third reeds having downward stresses much smaller than said upward stress of said first spring, the downward stroke of said push-button comprising two consecutive phases, namely:

a first phase during which said pressure exerted on said push-button is directed against the differential force of said stresses of said first and second springs so that said second terminal of said multifrequency generator is disconnected from said second wire of said telephone line and at the end of which said selection circuit of said frequency group is connected to said multifrequency generator for selecting said frequency group; and a second phase during which said pressure exerted on said push-button is only directed against said upward stress of said first spring, so that after the beginning of said second phase said second terminal of said multifrequency generator is connected to said second wire of said telephone line for transmitting said frequency group to said telephone line.

2. A push-button switch device for a multifrequency dialling telephone set as claimed in claim 1, in which, during said first phase, said first reed is subjected to any stress of said first and second springs and said third rigid reed is only moved by said mechanical means, said second rigid reed being only in electrical contact with said fourth reed and bending said fourth flexible reed.

3. A push-button switch device for a multifrequency dialling telephone set as claimed in claim 2, in which, during said second phase, said first reed is only subjected to said downward torsion stress of said second spring so that said pair of contacts and said simple contact of said first reed are respectively pressed against said pair of contacts and said simple contact of said selection circuit and, after the beginning of said second phase, only said second and third rigid reeds are moved in electrical contact by said mechanical means, said fourth flexible reed not being in contact with and not being bent by said second rigid reed.

4. A push-button switch device for a multifrequency dialling telephone set as claimed in claim 3, in which the displacement of said movable ends of said second and third rigid reeds is greater than said push-button stroke.

5. A push-button switch device for a multifrequency dialling telephone set as claimed in claim 4, in which said displacement of said movable ends of said second and third rigid reeds is greater than 2.5 mm.

6. A push-button switch device for a multifrequency dialling telephone set as claimed in claim 5, in which said pair of contacts and said simple contact of said first reed are respectively pressed by downward stress of said second spring against said pair of contacts and said simple contact of said selection circuit so as to select said frequency group, when the push-button has travelled at least 0.5 mm from the beginning of said push-button stroke, and said second and third reeds are in contact so as to connect said second terminal of said multifrequency generator to said second wire of said telephone line, when the push-button has travelled at least 1 mm from the beginning of said push-button stroke.

7. A push-button switch device for a multifrequency dialling telephone set as claimed in claim 6, in which said mechanical means comprises a guide element associated with said push-button for vertically moving said first rigid reed, and a bolt which is horizontally movable by the vertical displacements of one of said guide elements, each of said second and third reeds having recesses adapted to slide on a guide pin of said movable bolt which guides said movable ends of said second and third reeds into and out of electrical contact, the body of said guide element being directly subjected to said differential force of said stresses of said first and second springs during said first stroke phase and to said upward stress of said first spring during said second stroke phase.

8. A push-button switch device for a multifrequency dialling telephone set as claimed in claim 7, in which said guide element has its uppor portion covered by said push-button and abuts against said casing under upward stress of said first spring, so that the dimensions of said push-button and of said guide element are respectively independent and dependent on said push-button stroke and the operating characteristics of said push-button switch device.

* * * * *